US009916507B1

(12) United States Patent
Freedman et al.

(10) Patent No.: US 9,916,507 B1
(45) Date of Patent: *Mar. 13, 2018

(54) DETECTING ORBITAL DEBRIS

(71) Applicant: RKF Engineering Solutions, LLC, Washington, DC (US)

(72) Inventors: Jeffrey Freedman, Laurel, MD (US); Erik Halvorson, Vienna, VA (US)

(73) Assignee: RKF Engineering Solutions LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/940,264

(22) Filed: Nov. 13, 2015

Related U.S. Application Data

(63) Continuation of application No. 13/647,943, filed on Oct. 9, 2012, now Pat. No. 9,189,451.

(Continued)

(51) Int. Cl.
| | |
|---|---|
| *G06F 17/00* | (2006.01) |
| *G06K 9/00* | (2006.01) |
| *H04N 5/232* | (2006.01) |

(52) U.S. Cl.
CPC ..... *G06K 9/00771* (2013.01); *H04N 5/23206* (2013.01); *H04N 5/23229* (2013.01)

(58) Field of Classification Search
CPC ........ H04N 7/18; G06K 9/00771; G06K 9/00; G08B 13/196

(Continued)

(56) References Cited

U.S. PATENT DOCUMENTS 3,121,605 A * 2/1964 Nunn ............... G03B 15/16
346/107.2
3,464,116 A 9/1969 Kissell
(Continued)

FOREIGN PATENT DOCUMENTS

| CN | 101783888 A | 7/2010 |
|---|---|---|
| CN | 101539627 B | 5/2011 |
| CN | 102096273 A | 6/2011 |

OTHER PUBLICATIONS

Tang Zhenghong et al. Monitoring Faint Space Debris with Rotation Drif-Scan CCD, Oct. 17, 2011, US-China Space Surveillance Technical Interchange, National Astronomical Observatories, CAS, Beijing, China.*

(Continued)

*Primary Examiner* — Tung Vo
*Assistant Examiner* — Zaihan Jiang
(74) *Attorney, Agent, or Firm* — Fish & Richardson P.C.

(57) ABSTRACT

A network device determines an exposure time associated with an image sensor coupled to a spacecraft for capturing an image of a target object orbiting the Earth. The network device computes a maximum relative angular velocity associated with the target object based on the exposure time and a dimension of a pixel of the image sensor. The network device identifies a first pointing direction of the image sensor for initiating a search for the target object. The network device generates a first angular velocity probability distribution map for the target object and divides the first angular velocity probability distribution map into a first set of angular velocity regions (AVRs). The network device selects a first AVR from the first set of AVRs for scanning by the image sensor and generates a search schedule that includes a first entry for informing the spacecraft to scan the first AVR.

22 Claims, 7 Drawing Sheets

Related U.S. Application Data

(60) Provisional application No. 61/553,819, filed on Oct. 31, 2011, provisional application No. 61/544,252, filed on Oct. 6, 2011.

(58) Field of Classification Search
USPC .......................................................... 348/144
See application file for complete search history.

(56) References Cited

U.S. PATENT DOCUMENTS

| | | | |
|---|---|---|---|
| 5,899,945 A * | 5/1999 | Baylocq | G01C 11/02 348/143 |
| 5,963,166 A * | 10/1999 | Kamel | B64G 1/24 342/352 |
| 2003/0202682 A1 | 10/2003 | Yanagisawa | |
| 2006/0182322 A1 | 8/2006 | Bernhardt | |
| 2011/0240801 A1* | 10/2011 | Manzoni | B64G 1/1021 244/171.1 |
| 2012/0062787 A1 | 3/2012 | Muijs | |

OTHER PUBLICATIONS

Tang, Zhenghong et al., "Monitoring Faint Space Debris with Rotation Drif-Scan CCD", Oct. 17, 2011, US-China Space Surveillance Technical Interchange, National Astronomical Observatories, CAS, Beijing, China.

Gehrels, T., 1986, 1986, Instrumentation and Research Programmes for Small Telescopes, Proceedings of the 118th Symposium of the International Astronomical Union.

Office Action issued in U.S. Appl. No. 13/647,943 dated Jan. 12, 2015, 25 pages.

Notice of Allowance issued in U.S. Appl. No. 13/647,943 dated Jul. 17, 2015, 8 pages.

\* cited by examiner

DETECTING ORBITAL DEBRIS

CROSS-REFERENCE TO RELATED APPLICATIONS

This application is a continuation of U.S. application Ser. No. 13/647,943, entitled "Detecting Orbital Debris", filed on Oct. 9, 2012, which claims the benefit of U.S. Provisional Application Ser. No. 61/544,252, entitled "Searching for Orbital Debris with Multiple Satellites using Angular Velocity Regions", filed on Oct. 6, 2011, and U.S. Provisional Application Ser. No. 61/553,819, entitled "Detection of Orbital Matter", filed on Oct. 31, 2011, the entirety of which are hereby incorporated by reference as if fully set forth therein.

TECHNICAL FIELD

This document generally relates to detecting orbital debris.

BACKGROUND

Typically, man-made objects sent into space have limited useful lifetimes. Some of these objects remain in orbit about the Earth even when they no longer serve any useful purpose.

SUMMARY

The present disclosure describes systems and techniques by which orbital debris may be detected by an image sensor on board a spacecraft. The image sensor detects orbital debris using a search schedule, which is based on partitioning the space of angular velocities of the orbital debris into angular velocity regions (AVRs) and detecting orbital debris by scanning selected AVRs. The image sensor is slewed at an angular speed and in a direction corresponding to the central angular velocity associated with the AVR presently searched. The angular speed and direction of slew of the image sensor changes as the AVR searched is changed.

In one aspect, a network device determines an exposure time associated with an image sensor coupled to a spacecraft for capturing an image of a target object orbiting the Earth. The image sensor includes a matrix of photo-sensitive pixels. The network device computes a maximum relative angular velocity associated with the target object based on the exposure time and a dimension of a pixel in the matrix of pixels. The network device identifies a first pointing direction of the image sensor for initiating a search for the target object. The network device accesses target object orbital data. The network device generates, based on the first pointing direction and the target object orbital data, a first angular velocity probability distribution map that indicates probabilities of the target object having different angular velocities as viewed by the image sensor when the image sensor is pointing in the first pointing direction. The network device divides the first angular velocity probability distribution map into a first set of angular velocity regions (AVRs), each AVR having a central angular velocity and having a size corresponding to the computed maximum relative angular velocity. The network device selects a first AVR from the first set of AVRs for scanning by the image sensor. The network device generates a search schedule that includes a first entry for informing the spacecraft to scan the first AVR. Scanning the first AVR comprises positioning the image sensor at the first pointing direction and rotating the image sensor at an angular speed and direction corresponding to the central angular velocity of the first AVR.

Implementations may include one or more of the following features. Computing the maximum relative angular velocity may comprise dividing the pixel dimension by the exposure time. The network device may determine, for the first entry added to the search schedule, whether an additional scan of the first AVR is to be performed. Responsive to determining that an additional scan of the first AVR is to be performed, the network device may update the search schedule with a second entry for informing the spacecraft to scan the first AVR.

The network device may determine whether the search schedule is complete. Based on determining that the search schedule is not complete, the network device may identify a second pointing direction of the image sensor at the end of scanning the first AVR. The network device may generate, based on the second pointing direction and the target object orbital data, a second angular velocity probability distribution map that indicates probabilities of the target object having different angular velocities as viewed by the image sensor when the image sensor is pointing in the second pointing direction. The network device may divide the second angular velocity probability distribution map into a second set of AVRs. The network device may select a second AVR from the second set of AVRs for scanning by the image sensor. The network device may update the search schedule for the image sensor with a second entry for informing the spacecraft to scan the second AVR. Scanning the second AVR may comprise positioning the image sensor at the second pointing direction and rotating the image sensor at an angular speed and direction corresponding to the central angular velocity of the second AVR.

The size of the second set of AVRs may be smaller than a size of the first set of AVRs. The network device may identify a third pointing direction of the image sensor at the end of scanning the second AVR. The network device may generate, based on the third pointing direction and the target object orbital data, a third angular velocity probability distribution map that indicates probabilities of the target object having different angular velocities as viewed by the image sensor when the image sensor is pointing in the third pointing direction. The network device may divide the third angular velocity probability distribution map into a third set of AVRs, the size of the third set of AVRs being smaller than the size of the second set of AVRs.

The network device may determine whether the search schedule is complete. Based on determining that the search schedule is complete, the network device may transmit the search schedule to the spacecraft.

The spacecraft may receive the search schedule from the network device. The spacecraft may read the first entry in the search schedule. Based on reading the first entry, the spacecraft may slew the image sensor starting from the first pointing direction for scanning the first AVR. The spacecraft may enable the image sensor for recording sensor readings as the image sensor scans the first AVR.

The spacecraft may determine whether there are additional entries in the search schedule. Based on determining that there are additional entries in the search schedule, the spacecraft may read the next entry in the search schedule. The next entry may include information for the spacecraft to scan a next AVR. Scanning the next AVR may comprise positioning the image sensor at the next pointing direction and rotating the image sensor at an angular speed and direction corresponding to the central angular velocity of the next AVR. Responsive to reading the next entry, the spacecraft may slew the image sensor starting from the next pointing direction for scanning the next AVR. The spacecraft may enable the image sensor for recording sensor readings as the image sensor scans the next AVR.

The target object may include orbital debris. The exposure time may include a time used by the image sensor for recording sensor readings. The exposure time may be based on at least one of a noise floor and threshold signal-to-noise ratio (threshold SNR) associated with the image sensor.

The exposure time may be based on at least one of size and distance of the target object. The size of each AVR may be at most as large as the maximum relative angular velocity.

The first set of AVRs may include AVRs of varying sizes, the size of an AVR based on a magnitude of an angular velocity of the target object at the center of the AVR. The size of an AVR may be proportional to the magnitude of the angular velocity at the center of the AVR, the size being smaller for a smaller angular velocity at the center of the AVR in comparison to a larger angular velocity at the center of the AVR.

The first set of AVRs may include AVRs with a shape that is one of a circular shape and a hexagonal shape. Selecting a first AVR from the first set of AVRs may comprise selecting the first AVR based on one of a random selection strategy and a probability of detection of the target object that is associated with each AVR in the first set of AVRs. The network device may include a ground-based computing device.

Implementations of the above techniques include a method, a computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
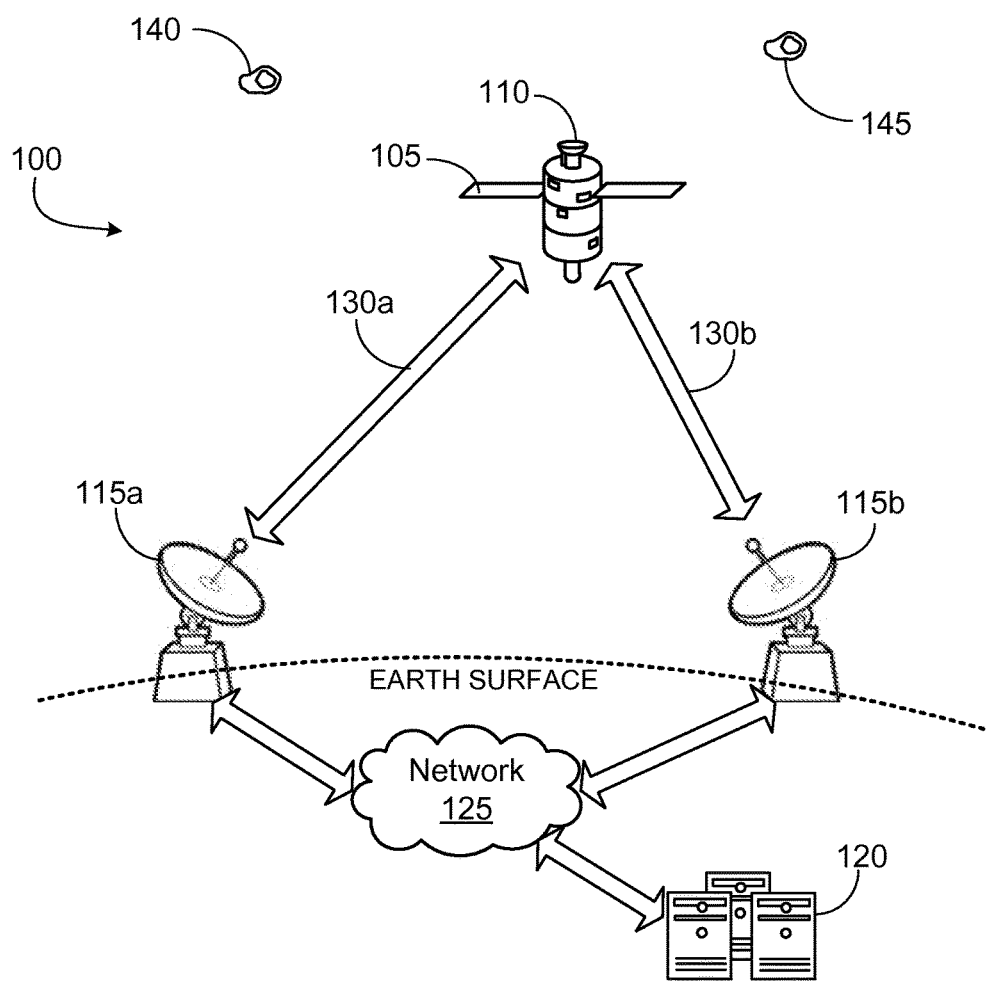
FIG. 1 illustrates an example of a system that may be used for detecting orbital debris.

Some man-made objects that are sent into space may remain in orbit about the Earth after their useful functional lifetimes, or after they have ceased to be operational, or both. Such space objects are a type of orbital debris. The amount of man-made debris in orbit is increasing at a rapid pace as more and more spacecraft are launched into orbit by both governments and, more recently, private companies. Examples of man-made orbital debris include derelict spacecraft and upper stages of launch vehicles, carriers for multiple payloads, debris intentionally released during spacecraft separation from its launch vehicle or during mission operations, debris created as a result of spacecraft or upper stage explosions or collisions, solid rocket motor effluents, and tiny flecks of paint released by thermal stress or small particle impacts. In addition to man-made objects in orbit, orbital debris also includes objects that consist of natural components, such as, for example, rock and ice.

Most orbital debris reside within 2,000 km of the Earth's surface, with some large concentrations of debris found at an altitude of 750-800 km from the Earth's surface. Some of the debris, such as debris in orbits below 600 km, normally fall back to Earth within several years. However, at higher altitudes, the orbital debris will typically remain in Earth orbit for longer periods. For example, at altitudes of 800 km, the time for orbital decay is often measured in decades. Above 1,000 km, orbital debris will normally continue circling the Earth for a century or more.

Orbital debris may pose a risk to continued reliable use of space-based services and operations, and to the safety of persons and property in space and on Earth. For example, operational spacecraft may collide with a large space object, such as a derelict satellite, which can cause significant damage to the operational spacecraft. Most orbital debris that re-enters the Earth's atmosphere is destroyed due to the severe heating that occurs during reentry, and debris that survives reentry is most likely to fall into the oceans or other bodies of water or onto sparsely populated regions. Nevertheless, a possibility exists that some of the debris may fall in inhabited areas, which may result in serious injury to humans or animals or significant property damage.

It may be useful to detect orbital debris in space and examine their trajectories to identify possible close encounters with operational spacecraft, or with terrestrial objects. For example, surveillance networks may monitor the trajectories of orbital debris, such that if debris is projected to come within a few kilometers of an operational spacecraft, the latter may be maneuvered away from the debris if the chance of a collision exceeds a certain threshold probability.

Orbital debris, which is also referred to as Resident Space Objects (RSOs) or space objects, may be detected using a Low Earth Orbit (LEO) satellite network. One or more cameras or telescopes, which include image sensors, mounted on a satellite may be used to capture images of orbital debris. The image sensor in a telescope or camera may be, for example, a charge-coupled device (CCD) image sensor having a matrix of photo-sensitive pixels that convert incoming photons into electrical signals to form an image.

In order to detect dim orbital debris, the exposure time of an image sensor is typically increased. The exposure time, which is also referred to as the integration time, is the amount of time that the image sensor allows photon energy to accumulate for a given image that is generated. To enable detection of an object, the exposure time is typically selected such that the amount of energy accumulated from photons received from the object results in an electrical signal having a strength greater than the noise floor of the sensor, with the likelihood of detection increasing as the amount of energy and, thus, the strength of the generated signal increases above the noise floor. For example, in a CCD image sensor, the integration or exposure time is the amount of time that electrical charges generated by photons are allowed to accumulate on, for example, a semiconductor-oxide interface in each pixel of the sensor when an image is generated. Less photons are received from a dim object than from a bright object, and, therefore, exposure time is typically increased to enable detection of dim objects.

Increasing the exposure time of the image sensor to better detect dim objects works well when the detected space object is stationary relative to the camera, but may not work as well when the object is moving relatively quickly. For example, if the space object is moving, then the energy received from the space object may be smeared across the pixels of the image sensor, preventing any given pixel from receiving sufficient energy to enable detection. Although it is sometimes possible to produce an image by, for example, adding the signals of each pixel that received energy from the dim object, such additive techniques can be very difficult to apply when detecting very dim space objects due to noise problems. Therefore, it may be useful to implement techniques by which image sensors mounted on one or more satellites can detect orbital debris that may be moving relative to the satellites.

In one implementation, the probability of detecting orbital debris by an image sensor mounted on a satellite may be improved by moving the image sensor at the same or approximately the same angular velocity as the space object. In this way, the space object generally stays at the same place relative to the image sensor, and, thereby, allows each pixel of the image sensor to generate a much stronger electrical signal. With very dim space objects, this technique can greatly increase the probability of detection. In this context, angular velocity refers to a pseudo-vector that has a magnitude corresponding to the angular speed (that is, rotational speed) and a direction that specifies both the direction of rotation and the axis of rotation.

The above technique uses knowledge of the trajectories of space objects. Although orbital debris can be very dim, the debris typically moves with predictable and bounded trajectories, particularly if the debris has stable (that is, nonescape velocity) orbits. In addition, the angular velocities of the orbiting debris tend to "cluster" into similar areas, with most orbits being roughly perpendicular (in angular velocity) to the detector's orbit. Therefore, the space of possible angular velocities of the orbital debris can be partitioned into "cells" of similar angular velocities, which are referred to as Angular Velocity Regions (AVRs). Orbital debris in each AVR can be detected by slewing the image sensor at the same angular speed and in the same direction as the angular velocity corresponding to the center of the AVR.

Methods, systems and devices are described in the following sections for developing and implementing a search schedule for detecting orbital debris. The search schedule is based on partitioning the space of possible angular velocities into AVRs and detecting orbital debris by scanning selected AVRs using an image sensor mounted on a satellite. For the purposes of this discussion, the terms orbital debris, debris, RSO and space object are used synonymously. The terms camera, image sensor, optical sensor and sensor are used interchangeably to refer to the same item, that is, an image sensor capable of detecting orbital debris. In addition, though the remaining sections are described in reference to an image sensor mounted on a satellite, the techniques described here are equally applicable to multiple image sensors mounted on one or more satellites, or other spacecraft.

FIG. 1 illustrates an example of a system 100 that may be used for detecting orbital debris. The system 100 includes a satellite 105 with an image sensor 110 mounted on board the satellite. The satellite 105 communicates with satellite gateways 115a and 115b over satellite links 130a and 130b respectively. Satellite gateways 115a and 115b are connected to a network operations center (NOC) 120 on the Earth's surface through the terrestrial network 125. Debris, such as 140 and 145, are moving in orbits around the Earth.

The satellite 105 is a satellite orbiting the Earth that is capable of capturing images of orbiting debris. For example, the satellite 105 may be a satellite in a network of LEO satellites at an altitude between 160 kilometers and 2000 kilometers. The satellite 105 also may be a Medium Earth Orbit (MEO) satellite that is orbiting the Earth at an altitude in the range of 2000 kilometers to 24000 kilometers, or a Geostationary (GEO) satellite that is at an orbit approximately 36000 kilometers above the Earth's equator. The satellite 105 also may represent a spacecraft other than a satellite that is capable of capturing images. For example, the satellite 105 may be the International Space Station (ISS).

The satellite 105 includes one or more image sensors that are coupled to the satellite, which may be used for detecting orbiting debris, such as 140 or 145. One such image sensor 110 is shown in FIG. 1. The image sensor 110 is configured for capturing images, including images of orbiting objects such as orbiting debris 140 or 145. The image sensor 110 may be a CCD image sensor or an active-pixel sensor (APS) such as a complementary metal-oxide-semiconductor (CMOS) APS. The image sensor 110 may be an optical sensor that is capable of capturing optical energy on a visible wavelength. Alternatively, the image sensor 110 may be an infrared detector that can detect electromagnetic radiation on infrared wavelengths that may be generated by space objects. In some implementations, the image sensor 110 also may be capable of detecting electromagnetic energy on other wavelengths, such as gamma ray, x-ray, ultraviolet, microwave or radio waves.

The image sensor 110 is mounted on a gimbal device that is coupled to the satellite 105. The gimbal device is a pivoted support device that allows the image sensor 110 to be rotated about one or more axes. In some implementations, the gimbal device may include a set of three gimbals, with one mounted on the other with orthogonal pivot axes. The image sensor 110 may be mounted on the innermost gimbal such that the image sensor 110 remains independent of the movement of the gimbal device itself due to the orbiting movement of the satellite. Therefore, the image sensor 110 may be kept upright with respect to a reference frame despite the satellite's pitching and rolling.

The satellite 105 includes one or more processors and storage media, such as a hard drive or flash memory, which store instructions that can be executed by the processors. By executing the instructions, the satellite 105 can operate the gimbal device to slew the image sensor 110 at a constant angular velocity. In this context, to slew the image sensor 110 means to rotate the image sensor 110 about a fixed axis in a specified direction at a specified rate. In some implementations, the image sensor 110 may be slewed in more than one direction sequentially.

Typically, the image sensor 110 is oriented to point outwards in space so that it may detect space objects through, for example, an aperture in the satellite 105. In some implementations, the orientation of the image sensor 110 is expressed with respect a reference frame that is fixed in the body frame of the sensor's patent object, that is, the satellite 105. For example, the orientation of the image sensor 110 relative to the satellite 105's reference frame, which also may be referred to as the sub-component reference frame, may be expressed by an azimuth and an elevation. The azimuth may be an angle measured from the X-axis in the XY-plane of the sub-component reference frame about its Z-axis in the counter-clockwise direction. The elevation may be expressed as the angle between the XY-plane of the sub-component reference frame and the image sensor pointing measured toward the positive Z-axis. Alternatively, the orientation of the image sensor 110 may be expressed by yaw, pitch and roll angles measured from respective axes of the satellite 105's reference frame.

In some implementations, the origin of satellite 105's reference frame may be the center of the satellite 105. The satellite 105 itself may have an orientation with respect to the Earth or other celestial bodies, lines of force of magnetic and gravitational fields, or other given directions in space. For example, the satellite 105's orientation with respect to the Earth may be specified by a nadir vector and a velocity vector. The nadir vector is a vector extending from the center of the satellite 105 to the center of the Earth, and the velocity vector is a vector extending from the center of the satellite 105 to a point in the direction in which the satellite is traveling in orbit. In other implementations, the orientation of the satellite 105 may be specified using some other suitable reference, such as a neighboring spacecraft or starfield databases. In some implementations, the orientation of the satellite 105 and that of the image sensor 110 may be considered to be the same.

The image sensor 110 may capture images of space objects that appear in its field of view (FOV) in the direction in which the image sensor 110 is oriented. The FOV may be thought of as a pyramid with a vertex that is at the focal point of the image sensor 110 and an axis extending in the direction the image sensor 110 is currently pointing. Typically, the FOV of the image sensor 110 is much smaller than the area of interest, which is the region of space in which orbiting debris are to be detected. For example, the area of interest may be several thousand kilometers in front of (or behind) the image sensor 110. However, the FOV may cover an area with an arc of 90 degrees in both the X-axis and the Y-axis with respect to the nominal (that is, un-gimbaled) direction of the image sensor 110 in the reference frame of the satellite 105.

The one or more processors on board the satellite 105 may execute instructions that cause the gimbal device to slew the image sensor 110 such that the image sensor scans the entire area of interest, that is, the FOV of the image sensor 110 covers the desired region of space. Techniques for determining areas of interest and rotating the image sensor 110 for scanning an area of interest are described in the following sections.

The satellite gateways 115a and 115b are terrestrial antennas that transmit and receive data in the form of electromagnetic radiation, such that communication with the satellite 105 are facilitated. The satellite gateways are controlled by the NOC 120. The NOC 120 is a central location from which network monitoring and control is exercised over the satellite 105. The NOC 120 may include one or more physical locations on the Earth's surface and may be managed by any suitable entity, such as business organizations, public utilities, universities, and government agencies, for overseeing operation of the satellite network that includes the satellite 105.

The NOC 120 communicates with the satellite gateways 115a and 115b via the network 125, which may include a circuit-switched data network, a packet-switched data network, or any other network able to carry data, such as Internet Protocol (IP)-based or asynchronous transfer mode (ATM)-based networks, including wired or wireless networks. For example, the network 125 may a Local Area Network (LAN) or a Wide Area Network (WAN). The network 125 may include the Internet, analog or digital wired and wireless networks (such as IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet and/or any other delivery or tunneling mechanism for carrying data, or any appropriate combination of such networks. In addition, the network 125 may be configured to handle secure traffic such as secure hypertext transfer protocol traffic (HTTPS) or virtual private networks (VPN) such that the connections between the NOC 120 and the satellite gateways 115a and 115b may be secure connections, such as using VPN or HTTPS. However, in other implementations, the connections may be unsecured connections.

In some implementations, the NOC 120 and one or both satellite gateways 115a and 115b are co-located. For the purposes of this discussion, the NOC 120 and the satellite gateways 115a and 115b are collectively referred to as the ground-based system (GBS).

The NOC 120 includes one or more computing devices configured to execute instructions stored on storage media, such as hard drives and flash memory. In some implementations, search schedules are determined through the execution of the instructions by the computing devices in the NOC 120. A search schedule includes information for rotating the image sensor 110 for searching a specific area of interest for detecting orbital debris. Different search schedules may be determined for different regions of interest based on AVRs. For example, the orbital debris 140 and 145 may correspond to different search spaces, such that the search schedules that detect them may be different. The determination of search schedules is described in detail in the following sections.

The NOC 120 transmits one or more search schedules to the satellite 105 through the gateways 110a and/or 110b, which communicate with the satellite through satellite channels 130a and 130b respectively. The satellite channels 130a and 130b are wireless communication channels. Each satellite channel includes an uplink communication path for the corresponding gateway to send to the satellite 105 control and telemetry information, which includes the search schedules for the image sensor 110. Each satellite channel may also include a downlink communication path for the satellite 105 to send data to the gateways 115a and/or 115b. The data may include image data captured by the image sensor 110 based on the search schedules. The gateways send the data received from the satellite 105 to the NOC 120. Subsequently the NOC processes the image data to determine whether orbital debris can be detected from the image data, and if detected, the direction and trajectory for the debris.

As indicated previously, an area of interest is compartmentalized into AVRs that are fed as input for generating search schedules for the image sensor 110. A search schedule may correspond to a set of AVRs that are scanned in a predetermined order to search efficiently the area of interest. The determination of AVRs uses knowledge of the angular velocities of orbital debris. In some implementations, the space of angular velocities of orbital debris is initially decomposed into sub-spaces of similar angular velocities. This may be performed by the computing devices at the NOC 120. In other implementations, the processors on board the satellite 105 may be configured to perform the decomposition.

In some implementations, the NOC 120 or the satellite 105 may pre-compute a variety of reasonable angular velocity distribution (RAVD) plots for a multitude of different image sensor 110 pointing directions (that is, orientations). Each RAVD plot is a plot of a distribution that shows the probability of orbital debris having a particular angular velocity relative to the image sensor 110 when the image sensor is pointing in a particular pointing direction. The RAVD plot allows identification of the subset of angular velocities that have a higher probability to correspond to the angular velocities of orbiting debris, given the image sensor's pointing direction.

Typically, the RAVD plot is computed by accessing known debris orbit data corresponding to debris that the satellite 105 is attempting to detect. Known debris orbit data is information that has been catalogued (for example, by the U.S. Government) that describes the orbits around the Earth of different types of known, non-escape velocity debris. Selection of the proper known debris orbit data typically requires knowledge of the type of debris of interest (for example, debris above 1 cm in size) and the target distance, that is, the distance from the focal point of the image sensor 110 to the debris of interest (for example, 3000 km from focal point of image sensor). Once selected, the known debris orbit data may be processed based on the known pointing direction (orientation) of the image sensor 110 to generate a probability distribution of reasonable angular velocities that may be used to estimate which angular velocities are more likely to correspond to the angular velocities of orbiting debris of interest.

In some implementations, the RAVD plot may be generated by using an apriori probability distribution for debris orbits, which is given by p(x), where x is a random variable corresponding to the debris orbit. Using standard probabilistic computation and the known behavior of the image sensor 110, an observation probability p(y|x) may be characterized, where p(y|x) is the probability that the observation y corresponds with a known orbit x. That is, p(y|x) indicates the probability that the image sensor 110 would give a reading y when a debris is known to be present in orbit x. Using standard estimation and detection techniques, such as Bayes Rule, p(x|y) may be obtained from p(y|x), where p(x|y) is the probability that there is debris in orbit x when the image sensor provides a reading y. The distribution p(x|y) may be sampled using standard techniques to generate the RAVD plot.

Figure 2A:
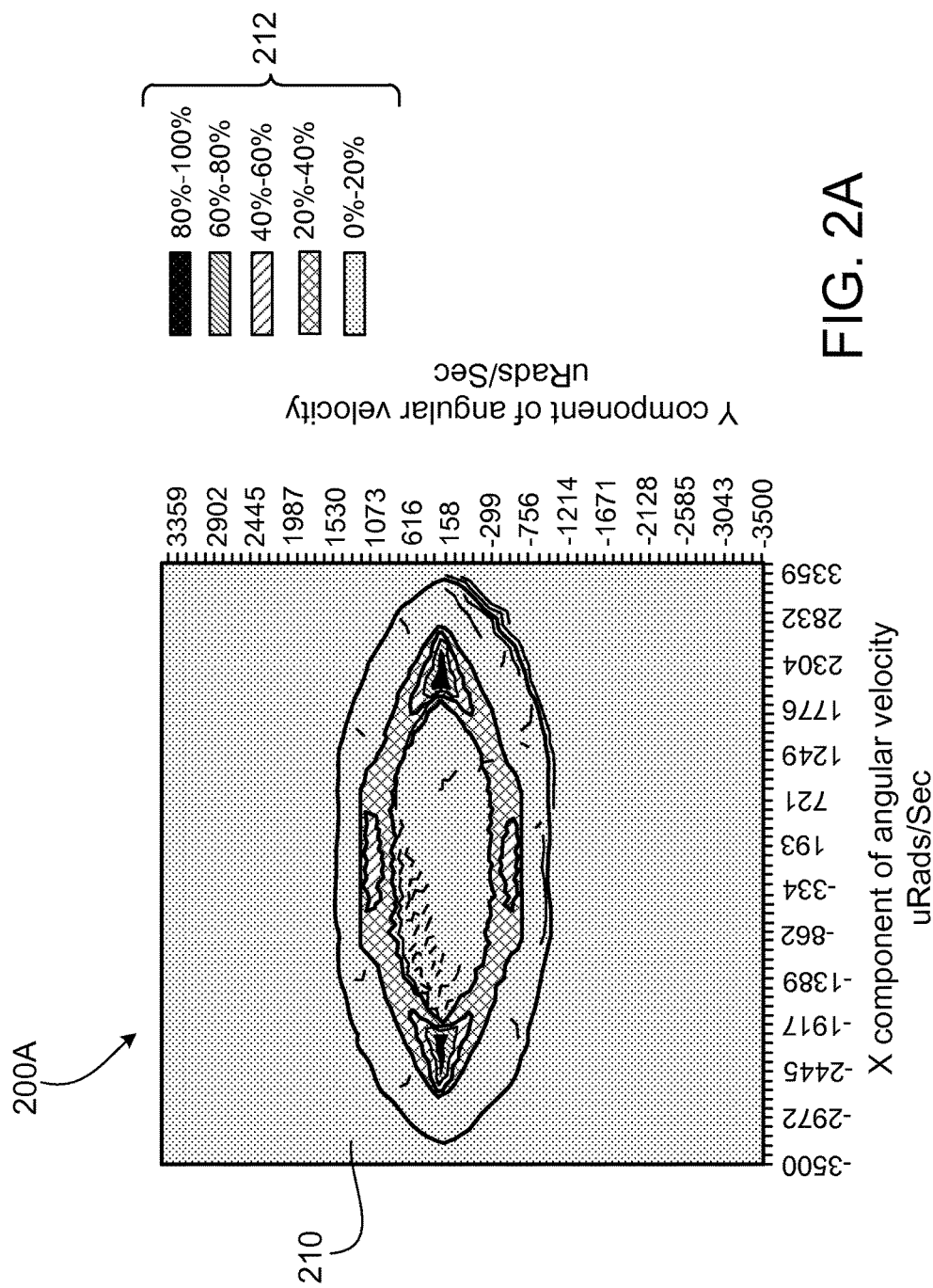
FIG. 2A illustrates an exemplary reasonable angular velocity distribution (RAVD) plot of orbital debris relative to an image sensor for a given image sensor pointing direction.

FIG. 2A illustrates an exemplary reasonable angular velocity distribution (RAVD) plot 200A of orbital debris relative to an image sensor for a given image sensor pointing direction. The plot 200A may be computed, for example, by the NOC 120. The plot 200A includes a graph 210 and a key 212 for identifying the percentage distributions indicated on the graph 210.

The plot 200A provides a normalized probability distribution of reasonable angular velocities at different orbits in which debris are likely to be detected, at a certain target distance from an image sensor having a particular orientation or pointing direction on board a satellite. In some implementations, the plot 200A may be customized for a specific image sensor, for example, the image sensor 110. As stated above, the plot 200A may be generated by processing known debris orbit data based on the pointing direction of the image sensor.

The graph 210 displays the probability distribution of reasonable angular velocities at the given target distance, with each point in the plot indicating a normalized probability of orbital debris having the corresponding angular velocity. In this exemplary RAVD plot, the dimension of the angular velocities is expressed in micro-radians per second (µRads/sec), with the X- and Y-axes of the graph 210 indicating values of the X- and Y-components of the angular velocities.

The points in the graph 210 are coded using a suitable representation, for example, color coded, with different codes representing different normalized probabilities of orbital debris having the corresponding angular velocities. The values provided by the key 212 are percentiles computed as a percentage of a maximum probability constant. Therefore, an area on the graph 210 that corresponds to a percentile value of 80%-100% indicates a set of angular velocities that are more likely to correspond to angular velocities of orbiting debris than the set of angular velocities indicated by areas on the graph 210 corresponding to lower percentile values, such as, for example, 20%-40%.

To estimate the actual probability of orbital debris having an angular velocity within a particular set of angular velocities, the probability function used to generate the graph 210 is first multiplied by the maximum probability constant to, thereby, remove the normalization. After removing the normalization, the probability of orbital debris having an angular velocity within a particular set of angular velocities corresponding to a 2D area or region of the graph 210 may be calculated by integrating in two dimensions the non-normalized probability function over the particular set of angular velocities (that is, determining the volume under the 2D curve). The result of the integration is the probability that orbital debris have an angular velocity within the region of angular velocities of interest. For example, to determine the probability that orbital debris will have an angular velocity within the region of angular velocities corresponding to the 80%-100% triangle on the right-side of the graph 210, the probability function used to generate the graph 210 would have to be multiplied by the maximum probability constant and then would have to be integrated over the X and Y components of angular velocities to determine the volume under the 80%-100% triangle.

In some implementations, the plot 200A is used in implementing a search schedule that is used to scan for orbiting debris by focusing the scan on sets of angular velocities that plot 200A indicates have a higher probability of corresponding to the angular velocities of orbiting debris. Adopting such a search schedule may lead to an increase in both the accuracy and the efficiency of orbital debris detection.

In some implementations, an AVR map is developed based on the plot 200. An AVR is a grouping or "region" of angular velocities that are sufficiently close to one another such that if an image sensor were slewed at an angular velocity corresponding to the center of the AVR, the image sensor would detect debris moving at any angular velocity within the AVR as if that debris were completely stationary relative to the image sensor. The concept of an AVR may be best illustrated by considering the pixels of an image sensor and recognizing that a moving object is deemed stationary relative to the image sensor if it does not move from an area covered by one pixel to an area covered by a second pixel during the exposure time of the image sensor. It is axiomatic that orbiting debris that move at the exact same angular velocity as the image sensor are stationary relative to the image sensor (assuming we disregard radial movement). Orbiting debris that move at a different angular velocity than the image sensor will, of course, move relative to the image sensor and its pixels.

Figure 2B:
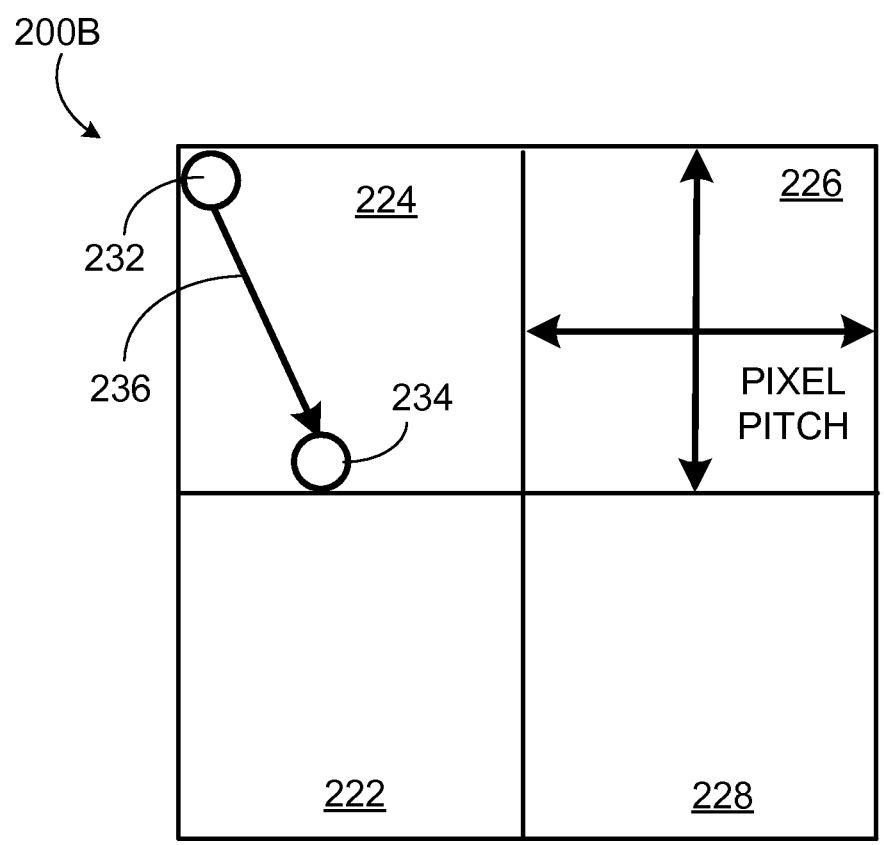
FIG. 2B illustrates a portion of an exemplary image sensor showing the area covered by four pixels of the image sensor.

For example, FIG. 2B illustrates a portion of an exemplary image sensor 200B showing the area covered by four pixels of the image sensor. The four pixels are represented by 222, 224, 226 and 228. The initial position of an orbital debris at the start of the exposure time of the image sensor 200B is indicated by 232. The position of the orbital debris at the end of the exposure time of the image sensor 200B is indicated by 234. The arrow 236 indicates the movement of the orbital debris from the position 232 to the position 234 during the time the image sensor 200B captured images of the orbital debris. As shown in FIG. 2B, the angular velocity of the orbital debris is such that the debris remains within the area covered by a single pixel, that is, pixel 224, during the exposure time of the image sensor 200B.

Therefore, FIG. 2B indicates that if the relative movement between the debris and the image sensor is small enough such that the object fails to move from the area covered by one pixel of the image sensor to an area covered by a different pixel during the exposure time, the object will, despite its movement, be detected by the image sensor as if it were completely stationary.

An AVR, therefore, is tied to the pixel dimension of the image sensor and encompasses all angular velocities from a particular center angular velocity that would be deemed stationary by an image sensor when the image sensor is slewed at an angular speed and in a direction corresponding to the center angular velocity. Assuming that the pixels are square, the resulting Angular Velocity Regions (AVRs) may be approximately circular.

The orbital angular velocities indicated by the plot 200A may be searched for debris detection by slewing an image sensor at rates similar to the angular velocities being scanned. This may be performed efficiently by partitioning the space of reasonable angular velocities depicted in the plot 200A into an AVR map and then scanning the AVRs one at a time to detect debris. An AVR may be searched or scanned by moving the image sensor at an angular speed and in a direction that corresponds to the angular velocity at the center of the AVR. Any debris having an angular velocity within the AVR will appear stationary to the image sensor. Because the debris appears stationary to the image sensor, the image sensor is able to maximize the amount of energy received from the debris, making detection of dim debris more likely. Moreover, by decomposing the space of reasonable angular velocities in this manner, it may be possible to focus the searching effort on AVRs that are more likely to have debris, and thus detect debris faster and more efficiently.

An AVR map for the purposes described above may be constructed by overlaying a set of AVRs on to the plot 200. The set of AVRs may be constructed as described in the following sections.

Each set of AVRs may be customized for a specific image sensor. The size of an AVR and/or the number of AVRs depend on the characteristics of the image sensor and properties of the orbital debris to be detected. For example, the size of an AVR may depend on the noise floor and threshold signal-to-noise ratio (SNR) of the image sensor. The noise floor is a measure of the noise signal created at the image sensor from the sum of all the noise sources and unwanted signals in the system that affect the image sensor. The noise floor is a function of the thermal noise in the image sensor, the temperature of extra-terrestrial space in which the satellite is moving, and dark currents that may be generated in the extra-terrestrial space, among other factors. The noise floor affects the measurements made by the image sensor. For example, the exposure time may be less for an image sensor that has a lower noise floor compared to an image sensor that has a higher noise floor.

The noise floor contributes to the threshold SNR of the image sensor, which provides a measure of the amount of detection energy that the image sensor has to capture such that an accurate detection may be made of orbital debris. Therefore, the threshold SNR is associated with the probability of detection accuracy and indicates a degree of sensitivity of the image sensor.

Information on the noise floor, threshold SNR and other suitable physical parameters of the image sensor may be obtained prior to using the image sensor for searching orbital debris. For example, the parameters may be provided in a datasheet from the manufacturer. Alternatively or additionally, the parameters may be obtained by calibration of the image sensor during test runs and downloaded from the satellite to the NOC.

The physical characteristics of the orbital debris, such as brightness, also may be obtained prior to using the image sensor. In some implementations, the debris brightness manifests itself at the image sensor as the number of photons per second that are captured by the image sensor. A debris that is brighter results in a greater number of photons per second captured, compared to a debris that is less bright.

The brightness of the debris affects the exposure time of the image sensor. For brighter debris, more energy may be captured relatively quickly and therefore the exposure time may be less, compared to the amount of exposure time that may be needed for capturing an equivalent amount of energy from a less bright debris. Therefore, the exposure time of the image sensor can be inversely proportional to the debris brightness.

The debris brightness depends on the size of the debris and the target distance at which the debris is detected. Debris of a larger size may be brighter than debris of smaller size; consequently, larger debris may be detected with less exposure time compared to smaller debris. The size of the debris as seen from the image sensor varies inversely with the target distance. The debris at a greater target distance may appear smaller to the image sensor compared to debris at a closer target distance, which may result in the debris at the greater target distance appearing less bright to the image sensor compared to debris at the closer target distance. Therefore, the image sensor may be configured with a longer exposure time when searching for debris at a greater target distance, while in comparison the exposure time may be shorter when searching for debris at a closer target distance.

In addition to the parameters discussed above, the size of an AVR may depend on the dimension of the pixels of the image sensor. A pixel is the smallest scalar element of a multi-component representation of the image sensor and indicates the smallest addressable unit of the image sensor. In some implementations, all pixels of the image sensor have the same dimension, which is based on the FOV of the image sensor and the number of pixels that make up the image sensor, and may be expressed as FOV/number of pixels. Each pixel may have a square shape and the width of a pixel may be expressed as an angle. For example, for an image sensor with a 10 radians FOV and $10^6$ pixels, the width of each pixel may be $10^{-5}$ radians. Therefore, a pixel may capture images in a square pyramidal area that has a diameter of $10^{-5}$ radians at the surface of the image sensor, with the vertex of the pyramid being at the focal point of the image sensor.

Once all the parameters above are determined, the maximum relative angular velocity A may be computed. A indicates the maximum orbital angular velocity, relative to the angular velocity at which the satellite is moving, at which debris may be detected as if they were stationary by the image sensor. A is calculated based on the various parameters noted above, such as the noise floor of the image sensor, the brightness, size and target distance of the debris, and the pixel dimension. A may be computed as a function of the pixel dimension and the exposure time. For example, the maximum relative angular velocity A may be expressed as (pixel dimension/exposure time).

In some implementations, A may be computed based on the following. Let E denote the energy needed to trigger a positive reading (in Joules) on the image sensor, while E' denotes the power received at the sensor from the orbital debris (in Watts). The exposure time t that may be used to achieve a reading is given by the equation t=E/E'. E' is typically estimated based on the reflectivity of the debris, the angle of the sun, the aperture of the image sensor, and many other parameters. Let $\theta$ be a fixed angle covered by the pixel pitch. Then the maximum angular velocity A may be given by the equation A=$\theta$/t.

The above example of an equation for computing A does not consider partial detections or detections with probability. At low light levels, the image sensor may be affected by noise to a large extent, which may increase the exposure time.

After determining A, the AVRs may be computed by dividing the space of reasonable angular velocities into a set of AVRs. For example, the plot 200A may be divided into a set of AVRs. In some other implementations, the space of all possible angular velocities (that is, the whole plot 200, including angular velocities having zero or near-zero probability values) is divided into a set of AVRs. In either case, the angular velocities are divided into a set of AVRs such that the maximum dimension of each AVR is not greater than twice A. This implies that the angular velocities corresponding to each AVR that is scanned by the image sensor does not deviate from the central angular velocity of the AVR by more than the maximum relative angular velocity A.

Figure 3A:
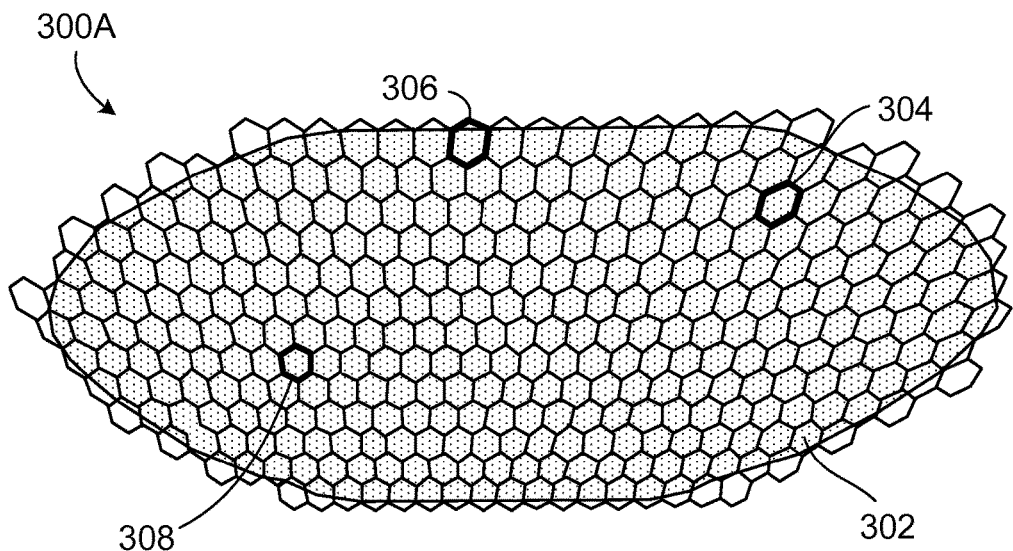
FIGS. 3A and 3B illustrate examples of AVR maps.
Figure 3B:
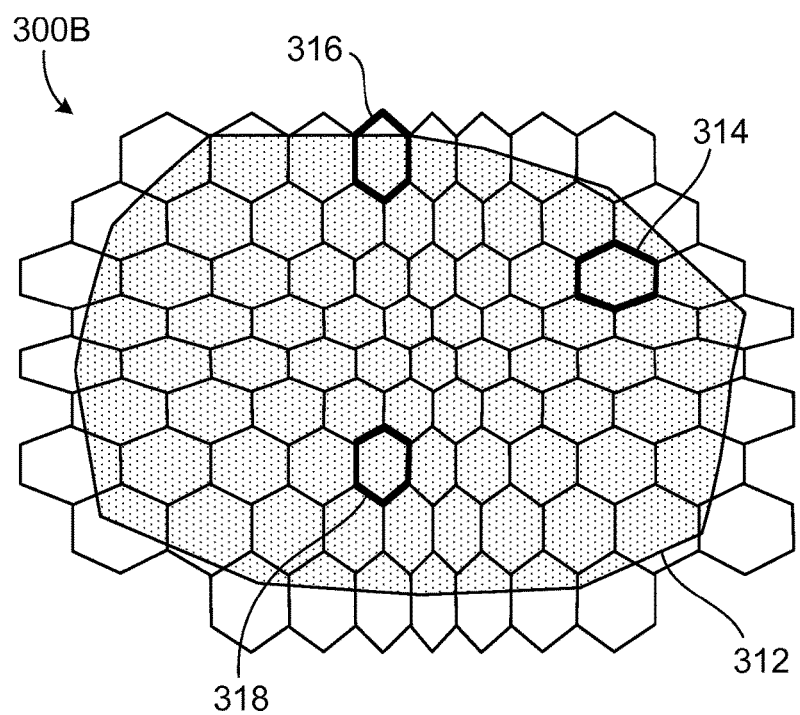

Referring back to the plot 200, by dividing the space of reasonable angular velocities into AVRs, an AVR map may be obtained. FIGS. 3A and 3B illustrate examples of AVR maps 300A and 300B respectively. The maps 300A and 300B may be generated, for example, based on the plot 200, which corresponds to reasonable angular velocities for orbital debris when the image sensor is pointing in a particular direction (that is, orientation). The NOC 120 or the satellite 105 may generate the maps 300A and 300B. Accordingly, the following sections describe the maps 300A and 300B as generated by the system 100 using the plot 200. However, the maps 300A and 300B may be generated by other systems based on other angular velocity probability distribution maps.

FIG. 3A shows an AVR map 300A in which the size of all the AVRs is uniform. The AVR map 300A includes an underlying reasonable angular velocity probability distribution plot 302, on which AVRs, such as 304, 306 and 308 are overlaid.

The reasonable angular velocity probability distribution plot 302 may be the RAVD plot 200. The set of AVRs overlaid on the plot 302, which include AVRs 304, 306 and 308, may be generated based on the maximum relative angular velocity A, as discussed above. The AVRs computed in the manner described above are all circular in shape, with each having a radius that is equal to A. However, it may not be possible to cover completely a planar region, such as the plot 302, with circles of radius A without either overlapping or missing parts of the planar region. Therefore, in some implementations, the AVRs are represented as hexagons, with distance from the center of a hexagon to each corner of the hexagon being limited by A. Hence, each of the AVRs in the map 300A (and also 300B), such as 304, 306 or 308, is hexagonal in shape. Representing AVRs as hexagons ensures that all areas of the plot 302 are covered, that is, all debris orbits are captured by at least one AVR, while avoiding overlap between AVRs.

Since the size of each AVR is based on A while the underlying plot 302 is pre-computed, the number of AVRs in the set of AVRs in the map 300A depends on A. Therefore, following the dependency chain for A, the number of AVRs is a function of the sensor pixel size and exposure time, with the latter being dependent on the brightness of the debris. Dim debris with a poor image sensor may have a larger number of smaller AVRs, while bright debris with an image sensor of high sensitivity may have a smaller number of large AVRs.

As shown in map 300A, the AVRs 304, 306 and 308 all have the same size. However, in some implementations, the size of the AVRs in a set of AVRs may vary. FIG. 3B shows an AVR map 300B in which the size of the AVRs vary. The AVR map 300B includes an underlying angular velocity probability distribution map 312, on which AVRs, such as 314, 316 and 318, are overlaid.

An AVR is sized such that, if the image sensor is slewed at an angular speed and in a direction that corresponds to the angular velocity of the center of AVR, orbital debris having angular velocities near the edge of the AVR can also be detected. As described previously, the size of the AVR may depend on the pixel size and the exposure time for the orbital debris that the image sensor is attempting to detect. The exposure time, in turn, depends on the brightness of the orbital debris being detected, the distance to the orbital debris, and the sensitivity of the image sensor.

The apparent brightness of the orbital debris (that is, the signal level at the image sensor generated from photons received from the orbital debris) follows an inverse square law. As such, orbital debris that are closer to the image sensor require less exposure time compared to orbital debris that are farther away. Closer orbital debris also tend to move faster (relative to the sensor) than farther orbital debris. Therefore, most orbital debris that move at very high speed may be closer to the sensor and hence, may be captured with less exposure time. This observation assumes that the orbital debris follow a set of reasonable orbits.

Since the closer orbital debris use less integration time, the AVRs can be bigger. That is, A is equal to (pixel dimension)/(exposure time), and, consequently, a smaller exposure time leads to a bigger A. The size of the AVRs, therefore, may be proportional to the magnitude of the angular velocity. Orbital debris with small angular velocities will tend to be much more distant from the image sensor and hence move more slowly. AVRs of smaller sizes, therefore, may be necessary to detect such slower moving orbital debris. On the other hand, orbital debris with larger angular velocities will tend to be moving faster and hence may be detected by scanning using larger AVRs.

Consequently, the angular velocity probability distribution map 312 may be divided into AVRs of varying sizes, with areas of the map that correspond to smaller angular velocities being covered by smaller AVRs and areas of the map that correspond to larger angular velocities being covered by larger AVRs. For example, AVR 314 may be larger than AVR 316, which in turn may be larger than AVR 318. Therefore, the angular velocities associated with AVR 314 may be greater than angular velocities associated with AVR 316, which in turn may be greater than the angular velocities associated with AVR 318.

The AVR maps 300A and 300B are pre-computed before they are used for directing the image sensor in the search for orbital debris. An AVR map may be pre-computed by the GBS for multiple different image sensor pointing directions/orientations. For example, the computing devices present at the NOC 120 may compute the AVR maps based on computer models and orbital parameters of target debris and the orientation/pointing direction of the image sensor 110 and/or satellite 105. Alternatively, in some implementations, the AVR maps 300A and 300B maps may be pre-computed by the satellite 105, for example, by executing the instructions, which are stored in the storage device onboard the satellite, using the one or more processors present on the satellite. The AVR maps, including, for example, AVR maps 300A and/or 300B, may then be leveraged to generate a search schedule for the image sensor 110.

Figure 4:
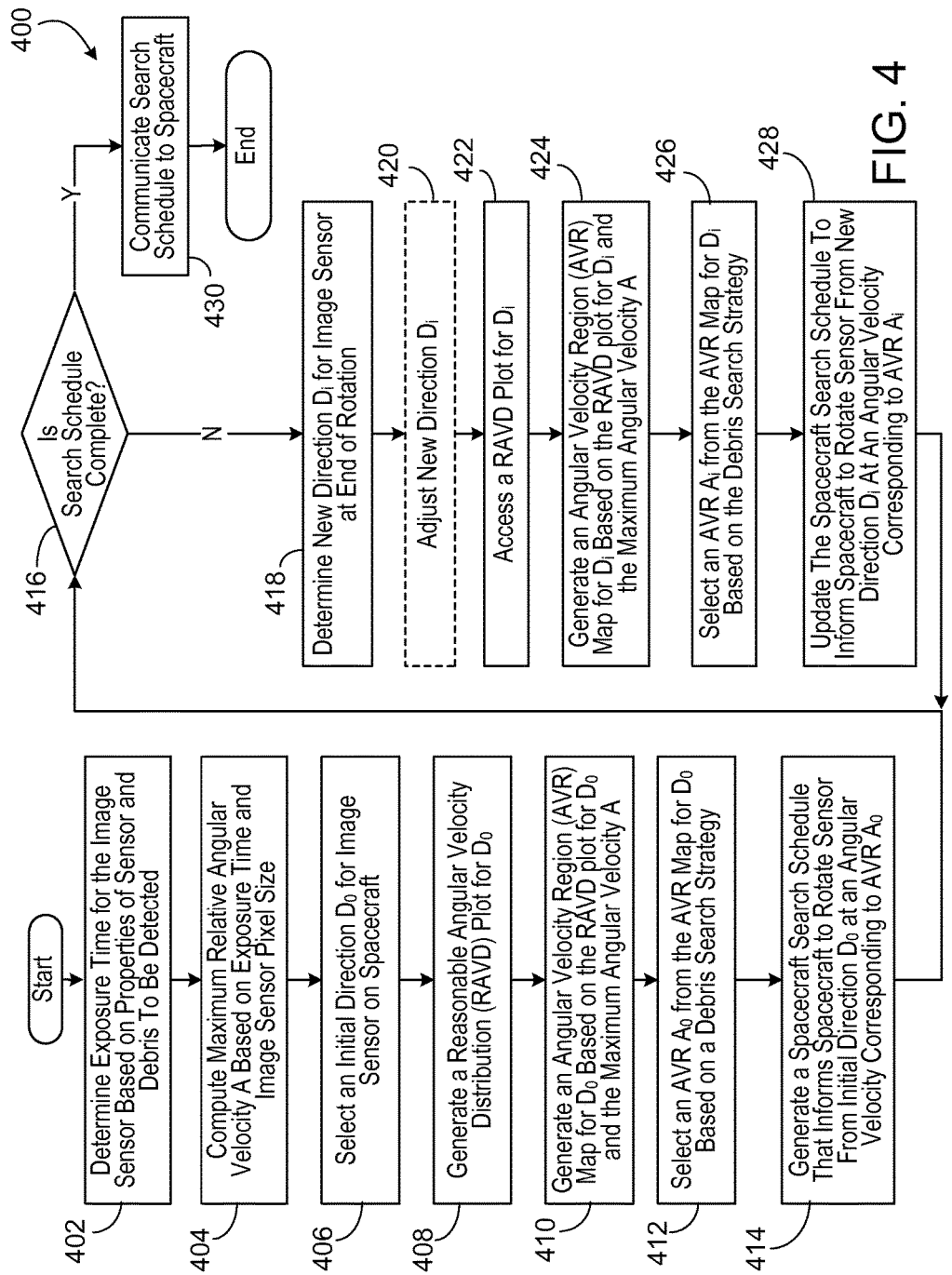
FIG. 4 illustrates an exemplary process that may be used for developing an AVR-based search schedule for an image sensor for detecting orbital debris.

FIG. 4 illustrates an exemplary process 400 that may be used for developing an AVR-based search schedule for an image sensor for detecting orbital debris. The process 400 may be used by NOC 120 to generate the AVR maps 300A and/or 300B, develop a search schedule for the image sensor 110 based on the AVR maps, and upload the search schedule to the satellite 105. Alternatively, the process 400 may be used by the satellite 105 itself to generate the AVR maps 300A and/or 300B and develop a search schedule for the image sensor 110. Accordingly, the following describes the process 400 as being implemented by the system 100. However, the process 400 also may be implemented by other systems and system configurations.

The process 400 starts by determining the exposure time for the image sensor based on the properties of the sensor and the properties of the debris to be detected (402). For example, in order to determine the maximum relative angular velocity A, the properties of the sensor, such as the noise floor, the threshold SNR and the pixel dimension, are obtained. In addition, parameters associated with the debris brightness, such as the size of the debris and the target distance, are determined. Based on the sensor and the debris properties, the exposure time of the image sensor 110 is computed. As discussed previously, the properties indicated above may be obtained, for example by the NOC 120, from manufacturer datasheets of the image sensor 110 and/or computer models generated by the computing devices at the NOC 120. Alternatively or additionally, the properties may be obtained from data downloaded from the satellite 105.

The maximum relative angular velocity A is computed based on the exposure time and the image sensor pixel size (404). For example, the NOC 120 may compute A by dividing the pixel dimension in micro-radians by the integration time in seconds.

An initial direction Do is selected for the image sensor on the spacecraft (406). For example, the NOC 120 may determine the initial direction Do based on a location of the satellite 105 and a location of debris of interest.

Once $D_0$ is determined, a reasonable angular velocity distribution (RAVD) plot is generated for $D_0$ (408). For example, the NOC 120 may generate the RAVD plot 200A based on the initial direction $D_0$ once $D_0$ is determined. As noted previously, the RAVD plot is specific to a particular image sensor pointing direction and is generated based on known debris orbit data.

Subsequently, an angular velocity region (AVR) map for $D_0$ is generated based on the RAVD plot for $D_0$ and the maximum angular velocity A (410). For example, the NOC 120 may generate the AVR map 300A or 300B based on the RAVD plot 200A and the maximum relative angular velocity A. Notably, while AVR maps 300A and 300B are maps that completely cover the distribution of reasonable angular velocities with AVRs shaped like hexagons with no overlaps or gaps, other AVR maps may include AVRs that overlap each other and/or that are separated by gaps. In some implementations, the AVR map may cover only portions of the distribution of reasonable angular velocities deemed to correspond to the highest probabilities. For example, it may be desirable to not restrict the placement of AVRs to a hexagonal or other type of grid layout and instead flexibly place the AVRs at whatever locations on the RAVD plot that best cover the highest probability angular velocities, even if such placement results in gaps between AVRs or AVRs overlapping.

An AVR $A_0$ is selected from the AVR map for Do based on a debris search strategy (412). For example, the NOC 120 may select one of the AVRs, such as 304, 306 or 308 if the AVR map for $D_0$ is 300A, or 314, 316, or 318 if the AVR map for $D_0$ is 300B. Determining which particular AVR to select may be based on the search strategy that is implemented for the particular search schedule being developed. In some implementations, an AVR may be selected from the AVR map using a random selection mechanism. In some other implementations, a deterministic strategy may be used to ensure that new debris is detected sufficiently often. For example, the selection of an AVR may be based on the associated probability distribution of the underlying RAVD map. AVRs that correspond to regions of the RAVD map with higher probabilities of detection may be selected more frequently compared to AVRs that correspond to regions of the RAVD map with lower probabilities of detection.

In some implementations, the strategy chosen may depend on the exposure time and the expected relative speed of the orbital debris. If the image sensor uses a very short exposure time, then it may be useful to select AVRs and directions that are widely distributed. On the other hand, if the exposure time used is high, then it may be useful to scan a small number of highly likely AVRs to ensure a maximum amount of detections.

Once the AVR $A_0$ is selected, a spacecraft search schedule is generated that informs the spacecraft to slew the sensor from initial direction $D_0$ at an angular velocity corresponding to AVR $A_0$ (414). For example, the NOC 120 creates a search schedule for the image sensor 110. The search schedule includes entries, with each entry based on a particular AVR. The NOC populates the first entry in the search schedule with information corresponding to the AVR $A_0$ as the initial control point, such as a time $T_0$ for initiating the search, the initial direction $D_0$ and the angular velocity at the center of $A_0$. Therefore, the satellite 105 may start the search at the time $T_0$ in the direction Do and scan AVR $A_0$ by slewing the image sensor 110 at an angular speed and in a direction corresponding to the angular velocity at the center of AVR $A_0$.

Once the search schedule is populated with at least one entry, it is determined whether the search schedule is complete (416). For example, in some implementations, the search schedule may be used to scan only a single AVR.

If it is determined that the search schedule is not complete, a new direction $D_i$ for the image sensor at the end of rotation is determined (418). Notably, as the image sensor rotates while scanning an AVR, the direction of the image sensor changes. Therefore, the NOC 120 may compute what the new direction for the image sensor 110 will be once it has completed scanning AVR $A_0$.

In some implementations, the new direction $D_i$ may be adjusted (420). For example, the search schedule may be developed such that the image sensor is configured to capture multiple images of the same AVR by repeating the scan of the same AVR multiple times. In such cases, once a scan ends with the image sensor pointing in a new direction, the image sensor may be re-oriented such that the image sensor again points in the starting direction of the AVR just scanned, and the scan of the AVR is repeated, allowing the image sensor to capture additional images of the same search space. This feature may be optional and may not be implemented in all scenarios, which is indicated by the dotted lines around (420).

Once the new direction $D_i$ is determined, an RAVD plot for $D_i$ is accessed (422). As described previously, the RAVD plot 200A may be dependent on the pointing direction (i.e., orientation) of the image sensor. Therefore, as the image sensor points in a new direction $D_i$ at the end of scanning the AVR $A_0$, the RAVD map that is now applicable may have changed. Consequently, the NOC 120 may compute a new RAVD map for the new direction $D_i$. In some implementations, the NOC 120 may store pre-computed RAVD maps for different orientations of the image sensor 110. In such implementations, the NOC 120 may simply access, from local storage, the RAVD map corresponding to the new direction $D_i$.

An angular velocity region (AVR) map for $D_i$ is generated based on the RAVD plot for $D_i$ and the maximum angular velocity A (426). For example, the NOC may generate a new AVR map for the new direction $D_i$, in a manner similar to that described for direction Do (410).

Once the AVR map for $D_i$ is generated, an AVR $A_i$ is selected from the AVR map for $D_i$ based on the debris search strategy (428). For example, the NOC 120 may select an AVR $A_i$ from the set of AVRs corresponding to the AVR map for $D_i$, in a manner similar to that described for direction $D_0$ (412). In some implementations, the search strategy that is used for selecting $A_i$ may be the same as that used for selecting $A_0$, and the same for selecting other AVRs. In some other implementations, different search strategies may be used for selecting different AVRs.

The spacecraft search schedule is updated to inform the spacecraft to scan AVR $A_i$ by slewing the image sensor from the new direction $D_i$ at an angular velocity corresponding to AVR $A_i$ (428). For example, the NOC 120 may populate the search schedule, which was created with AVR $A_0$ as the initial AVR, with a new entry corresponding to the AVR $A_i$, such as a time $T_i$ for starting the scan of AVR $A_i$, a starting direction $D_i$ for AVR $A_i$ and the angular velocity at the center of AVR $A_i$. Therefore, at the time $T_i$ the satellite may slew the image sensor 110 starting in direction $D_i$ and moving at an angular speed and in a direction corresponding to the angular velocity at the center of AVR $A_i$.

After the search schedule is updated with information on the AVR $A_i$, it is again determined whether the search schedule is completed (416). This check may be performed at the end of every round of updating the search schedule, where a round corresponds to determining the data for an entry in the search schedule for a particular selected AVR $A_i$ and populating the search schedule with the entry to enable scanning of the selected AVR $A_i$.

If there are more AVRs to scan, operations (418)-(428) are repeated. On the other hand, if it is determined that the search schedule is complete, the search schedule is communicated to the spacecraft (430). For example, the NOC 120 may send a complete search schedule to the satellite through one of the gateways 115*a* or 115*b*. The complete search schedule may include an entry corresponding to each AVR on which the search schedule is based.

In some implementations, each entry in the search schedule includes a start time for starting a scan, a direction of pointing the image sensor 110 at the start of the scan, an angular speed and a direction in which the image sensor 110 is to be moved during the scan, and a stop time for terminating the scan. The angular speed and direction in which the image sensor 110 is to be moved may correspond to the angular velocity at the center of the AVR associated with the entry. The stop time for terminating the scan may correspond to the time at which the image sensor 110 reaches a direction that points to the terminating edge of the AVR when the image sensor 110 is slewed at the specified rate, starting from the direction and at the start time indicated by the entry in the search schedule. The next entry in the search schedule may have similar fields as above. The starting direction for the next entry may be the same as the ending direction for the previous entry.

In other implementations, each entry in the search schedule includes a start time, an orientation of the image sensor 110 at the start time, and whether the sensor is on/off. In such implementations, the slewing of the image sensor may be determined from the start time and the orientation schedule. For example, two consecutive entries in the search schedule may be: T1 O1 sensor ON; T2 O2 sensor ON. In this example, T1 is start time corresponding to the first entry, O1 is the orientation of the image sensor at time T1 and sensor ON means that the image sensor 110 will be ON at time T1. T2 is the start time corresponding to the second entry, O2 is the orientation of the image sensor at time T1 and sensor ON means that that the image sensor 110 will be ON at time T2. The angular speed and direction of rotation of the image sensor may be determined as (O2-O1) in radians divided by T2-T1. Thus, the entries in the search schedule may imply an angular speed and a direction of rotation of the image sensor, but may not explicitly provide the angular speed and the direction.

Figure 5:
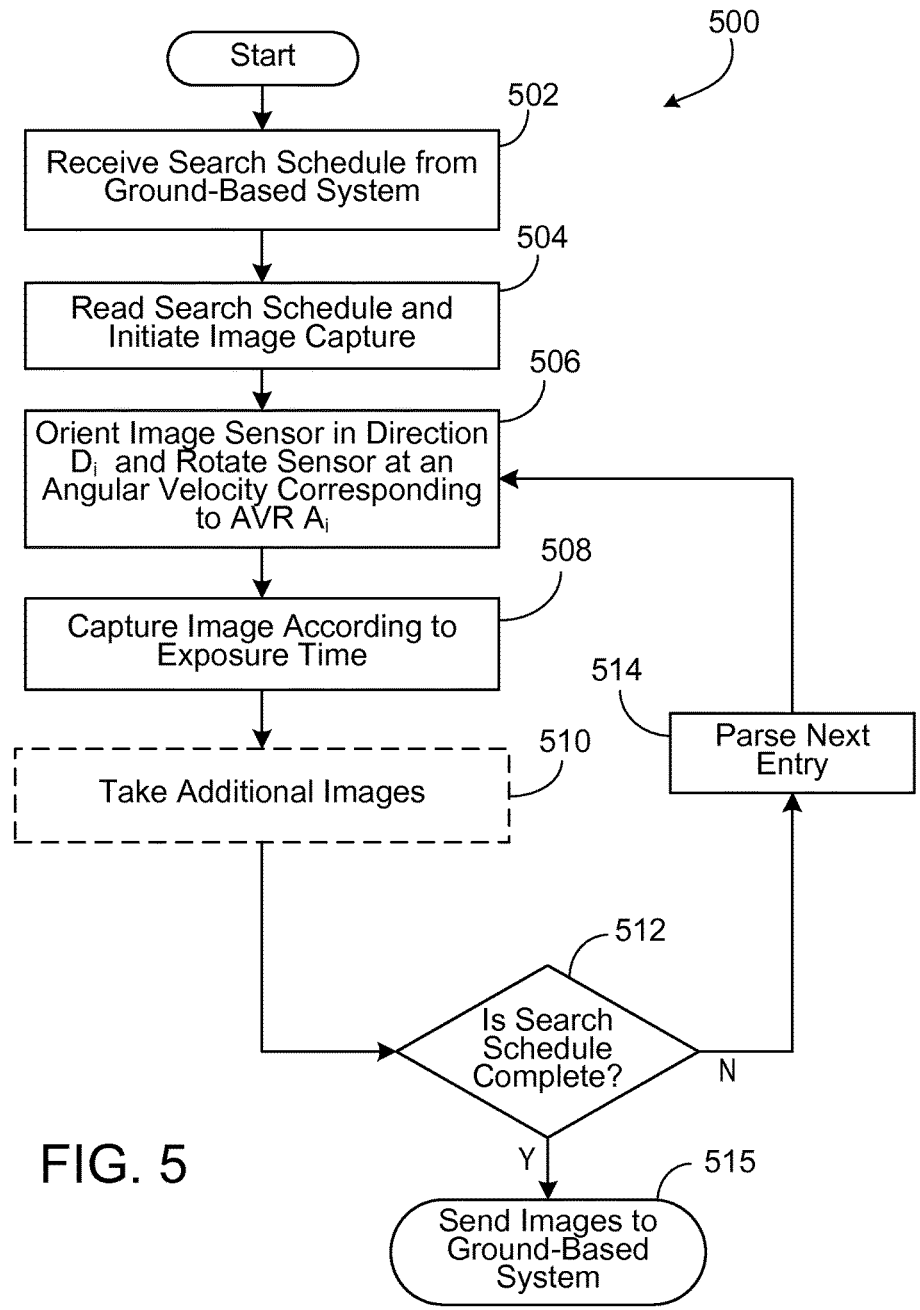
FIG. 5 illustrates an exemplary process that may be used for searching for orbital debris using an image sensor on board a satellite.

FIG. 5 illustrates an exemplary process 500 that may be used for searching for orbital debris using an image sensor on board a satellite. The process 500 may be used by the satellite 105 to slew the image sensor 110 according to a search schedule that is developed by the NOC 120, or by the satellite 105. Accordingly, the following describes the process 500 as being implemented by the system 100. However, the process 500 also may be implemented by other systems and system configurations.

The process 500 starts with the satellite 105 receiving a search schedule from the ground-based system (GBS) (502). For example, the NOC 120 may upload the search schedule to the satellite by one of the gateways 115*a* or 115*b* through the satellite channel 130*a* or 130*b* respectively. The search schedule may have been generated by the NOC 120 using the process 400.

The search schedule is read and image capture is initiated (504). For example, the satellite 105 may read the search schedule received from the NOC 120 and configure the gimbal device and the image sensor 110 to capture images in the directions indicated by the search schedule.

In some implementations, the search schedule may include instructions that, when executed by the processors on board the satellite 105, direct the gimbal device to slew the image sensor 110 based on the information provided by the search schedule, while the image sensor 110 is operated to capture images as it is slewed. In other implementations, the search schedule may include only data points for the various entries. Instructions that are stored in the memory onboard the satellite and executed by the satellite processors may suitably interpret the data points for rotating the image sensor and capturing the images.

The image sensor is oriented in direction $D_i$ and rotated at an angular velocity corresponding to AVR $A_i$ (506). For example, upon processing the information in the search schedule, the onboard processors may operate the gimbal device to orient the image sensor 110 in a direction $D_i$ that is indicated as the starting direction corresponding to the entry of the search schedule that is to be executed. Then, at the search start time for the entry, the onboard processors may trigger the gimbal device to slew the image sensor 110 at an angular speed and in a direction that is same as the angular velocity at the center of the AVR $A_i$, on which the currently executed entry of the search schedule is based. The onboard processors may further operate the gimbal device to stop the rotation of the image sensor 110 at a time that corresponds to the search end time for the entry in the search schedule.

An image is captured according to the exposure time (508). For example, while executing an entry in the search schedule, the processors onboard the satellite 105 may operate the image sensor 110 to open its shutter and capture images in the direction it is pointing as the gimbal device slews the image sensor 110 as described in (506). The image sensor 110 may be configured to start capturing images at the search start time for the entry. The onboard processors may further operate the image sensor 110 to stop the image capture when the exposure time of the image sensor is completed. In some implementations, the exposure time may be same as the search end time for the entry, while in other implementations, the exposure time may end before the search end time for the entry is reached.

The images captured by the image sensor 110 may be saved to local storage on the satellite 105. For example, the images may be saved to a hard drive or flash memory onboard the satellite.

In some implementations, additional images may be taken (510). For example, the search schedule may be developed such that the image sensor 110 is configured to capture multiple images of the same AVR. In such cases, the search schedule may include entries, based on which the gimbal is operated to slew the image sensor 110 back to the starting direction of the entry that was most recently executed once the image sensor reaches the end of the current scan. Then the gimbal again slews the image sensor 110 at an angular speed and in a direction that is the same as the angular velocity used in the previous scan, while the image sensor is operated to capture additional images of the same search space. This feature may be optional and may not be implemented in all search schedules, which is indicated by the dotted lines around (510). The additional images, if captured, may be saved to local storage on the satellite 105, as described above.

A determination is made whether execution of the search corresponding to the search schedule is complete (512). For example, at the end of execution of each entry in the search schedule, the instructions that are executed by the satellite processors may parse the data to determine whether there are further entries left.

If it is determined that the search corresponding to the search schedule is not complete, then the next entry is parsed (514), and the search processing is repeated based on the information corresponding to the next entry (506)-(510).

On the other hand, if the search corresponding to the search schedule is determined to be complete, the images are sent to the ground-based system (515). For example, the satellite 105 may send data corresponding to the images that are saved in its local storage to the NOC 120. The data may be downloaded to one of the gateways 115*a* and/or 115*b* over the satellite channel 130*a* or 130*b* respectively. The receiving gateway(s) forward the data to the NOC 120 over the network 125. At the NOC, the data may be processed for detecting orbital debris in the captured images. In some implementations, the data may be downloaded from the satellite 105 periodically in batches. For example, the satellite may collect data from several search schedules together and send them in one transmission. In other implementations, the data may be downloaded as they are collected. For example, the satellite 105 may send the data for a search schedule as soon as the search is completed.

Figure 6:
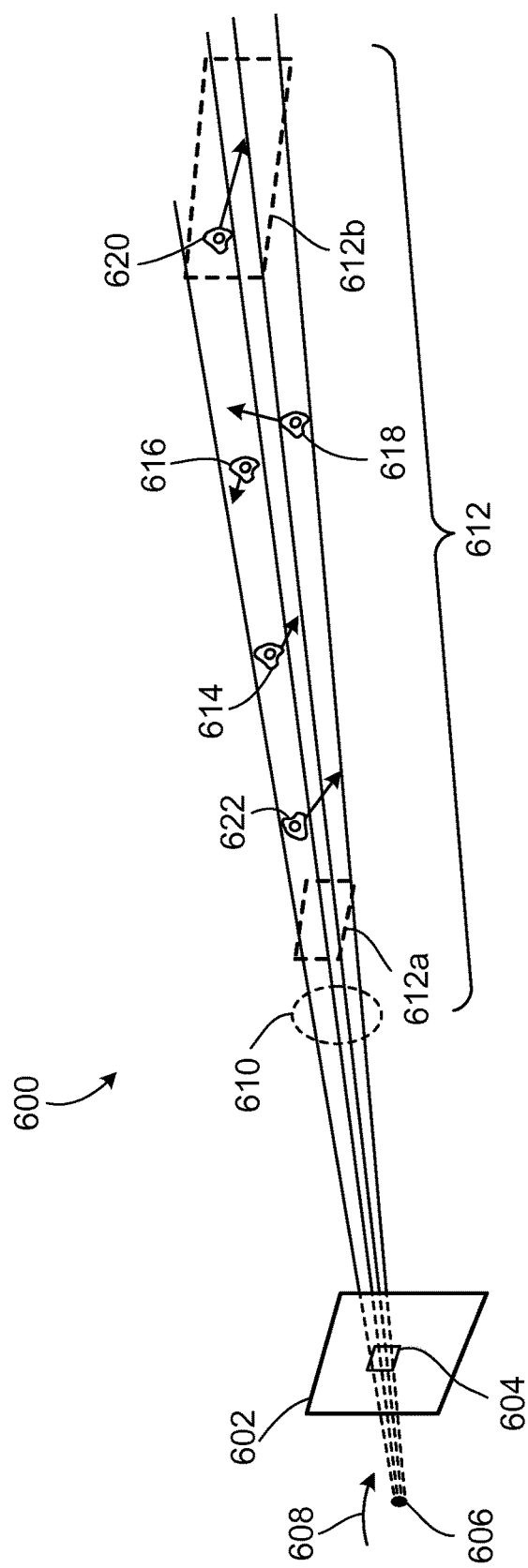
FIG. 6 illustrates an exemplary search performed by an image sensor on board a satellite for detecting orbital debris.

FIG. 6 illustrates an exemplary search 600 performed by an image sensor on board a satellite for detecting orbital debris. The search 600 may be performed, for example, by the image sensor 110 based on an entry in a search schedule developed by the NOC 120. Accordingly, the following describes the search 600 as performed by components of the system 100. However, the search 600 also may be performed by other systems.

The search 600 is performed by an image sensor 602 that includes a pixel 604 and has a focal point 606. The direction of the search is indicated by arrow 608. The area of the search is given by the pyramid 610, while the detection frustum is 612, between the planes 612*a* and 612*b*. Orbital debris are indicated by 614, 616, 618, 620 and 622.

The image sensor 602 may be same as the image sensor 110. The vertex of the pyramid 610 is at the focal point 606 of the image sensor 602. The area covered by the pyramid, which is a function of the width of the pixel 604, corresponds to the AVR on which search 600 is based.

The angular speed and direction of rotation of the image sensor 602 is based on the angular velocity at the center of the AVR on which search 600 is based. The angular speed and direction of rotation of the image sensor 602 is such that it is similar to the angular velocities of orbits within the detection frustum 612, with debris that are proximate to the plane 612*a* considered to be close to the image sensor, while debris in the proximity of the plane 612*b* considered to be at the farthest end from the image sensor.

The orbital debris 614, 616, 618, 620 and 622 are within the detection frustum of the image sensor 110, with debris 622 being closest to the image sensor, while debris 620 is the farthest away. The directions of movement of the debris are indicated by the arrow attached to each, with the arrow length representing the magnitude of the angular velocity of the associated debris. For example, each of debris 620 and 622 is associated with a longer arrow compared to debris 614. In addition, the arrows associated with 620 and 622 are approximately the same length. Therefore, the angular velocities of debris 620 and 622 are similar, and their angular velocities are greater than that of debris 614.

Based on the detection frustum, the debris 614 and 620 would be detected by the image sensor 110. In some implementations, the image sensor may detect the debris 614 and 620 as a single capture. The debris 622 is moving in the same direction as the rotation of the image sensor. Since the tangential speed of the debris 622 is similar to that of debris 620, but the former is much closer to the image sensor compared to the latter, the debris 622 may be moving too fast for the angular speed and direction of rotation of the image sensor 110. Therefore, the angular velocity of the debris 622 may not be in the AVR associated with the search 600, and the image sensor 110 may not be able to detect the debris 622. In addition, the image sensor 110 may not capture images of the debris 616 and 618, since they are moving in the direction opposite to the direction of movement of the image sensor 110 and consequently they are not in the AVR being searched.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (for example, magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (for example, a CRT (cathode ray tube) or LCD (liquid crystal display) monitor) for displaying information to the user and a keyboard and a pointing device (for example, a mouse or a trackball) by which the user can provide input to the computer. Other kinds of devices can be used to provide for interaction with a user as well; for example, feedback provided to the user can be any form of sensory feedback (for example, visual feedback, auditory feedback, or tactile feedback); and input from the user can be received in any form, including acoustic, speech, or tactile input.

The systems and techniques described here can be implemented in a computing system that includes a back end component (for example, as a data server), or that includes a middleware component (for example, an application server), or that includes a front end component (for example, a client computer having a graphical user interface or a Web browser through which a user can interact with an implementation of the systems and techniques described here), or any combination of such back end, middleware, or front end components. The components of the system can be interconnected by any form or medium of digital data communication (for example, a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by a network device, the method comprising:
   determining an exposure time associated with an image sensor that is coupled to a spacecraft and configured to capture an image of a target object orbiting the Earth;
   computing a first relative angular velocity associated with the target object based on the exposure time and a physical dimension of the image sensor;
   identifying a first pointing direction of the image sensor for initiating a search for the target object;
   accessing known orbital data for the target object;
   generating, based on the first pointing direction and the known orbital data, a first set of angular velocity regions (AVRs) that indicate probabilities of the target object having different angular velocities as viewed by the image sensor when the image sensor is pointing in the first pointing direction, wherein each AVR has a central angular velocity and size of an AVR is limited by the first relative angular velocity;
   selecting a first AVR from the first set of AVRs for scanning by the image sensor; and
   generating a search schedule that includes a first entry to instruct the spacecraft to search for the target object in the first AVR by rotating the image sensor, starting at the first pointing direction, at an angular speed and in a direction corresponding to the central angular velocity of the first AVR,
wherein the network device includes a satellite ground station, and wherein the spacecraft includes a satellite.

2. The method of claim 1, wherein the physical dimension of the image sensor includes a size of a pixel of the image sensor, and
wherein computing the first relative angular velocity comprises dividing the size of the pixel by the exposure time.

3. The method of claim 1, further comprising:
determining whether the search schedule is complete;
based on determining that the search schedule is not complete, determining a second pointing direction of the image sensor at completion of scanning the first AVR;
generating, based on the second pointing direction and the orbital data, a second a second set of AVRs that indicate probabilities of the target object having different angular velocities as viewed by the image sensor when the image sensor is pointing in the second pointing direction;
selecting a second AVR from the second set of AVRs for scanning by the image sensor; and
adding a second entry to the search schedule that instructs the spacecraft to search for the target object in the second AVR by rotating the image sensor, starting at the second pointing direction, at an angular speed and in a direction corresponding to the central angular velocity of the second AVR.

4. The method of claim 3, wherein a number of AVRs in the second set is different from a number of AVRs in the first set.

5. The method of claim 1, further comprising:
determining whether the search schedule is complete; and
based on determining that the search schedule is complete, transmitting the search schedule to the spacecraft.

6. The method of claim 5, further comprising:
receiving, at the spacecraft and from the network device, the search schedule;
reading, by the spacecraft, the first entry in the search schedule;
based on reading the first entry, slewing, by the spacecraft, the image sensor starting from the first pointing direction for scanning the first AVR; and
controlling, by the spacecraft, the image sensor for recording sensor readings as the image sensor scans the first AVR.

7. The method of claim 6, further comprising:
determining, by the spacecraft, whether there are additional entries in the search schedule;
based on determining that there are additional entries in the search schedule, reading, by the spacecraft, a second entry in the search schedule that includes instructions to search for the target object in a second AVR by rotating the image sensor, starting at a second pointing direction, at an angular speed and in a direction corresponding to the central angular velocity of the second AVR;
responsive to reading the second entry, slewing, by the spacecraft, the image sensor starting from the second pointing direction for scanning the second AVR; and
controlling, by the spacecraft, the image sensor for recording sensor readings as the image sensor scans the second AVR.

8. The method of claim 1, wherein the target object includes orbital debris.

9. The method of claim 1, wherein the exposure time includes a time used by the image sensor for recording sensor readings, the exposure time based on one or more of a noise floor, a threshold signal-to-noise ratio (threshold SNR) associated with the image sensor, a size of the target object, or a distance of the target object from the spacecraft.

10. The method of claim 1, wherein the size of an AVR is proportional to a magnitude of the angular velocity at the center of the AVR, the size of an AVR being smaller for a smaller angular velocity at the center of the AVR in comparison to a larger angular velocity at the center of the AVR.

11. The method of claim 1, wherein selecting the first AVR from the first set of AVRs comprises selecting the first AVR based on one of a random selection strategy or a probability of detection of the target object that is associated with each AVR in the first set of AVRs.

12. A device including a storage medium storing instructions that, when executed by one or more processors, are configured to cause the one or more processors to perform operations comprising:
determining an exposure time associated with an image sensor that is coupled to a spacecraft and configured to capture an image of a target object orbiting the Earth;
computing a first relative angular velocity associated with the target object based on the exposure time and a physical dimension of the image sensor;
identifying a first pointing direction of the image sensor for initiating a search for the target object;
accessing known orbital data for the target object;
generating, based on the first pointing direction and the known orbital data, a first set of angular velocity regions (AVRs) that indicate probabilities of the target object having different angular velocities as viewed by the image sensor when the image sensor is pointing in the first pointing direction, wherein each AVR has a central angular velocity and size of an AVR is limited by the first relative angular velocity;
selecting a first AVR from the first set of AVRs for scanning by the image sensor; and
generating a search schedule that includes a first entry to instruct the spacecraft to search for the target object in the first AVR by rotating the image sensor, starting at the first pointing direction, at an angular speed and in a direction corresponding to the central angular velocity of the first AVR,
wherein the device includes a satellite ground station, and wherein the spacecraft includes a satellite.

13. The device of claim 12, wherein the physical dimension of the image sensor includes a size of a pixel of the image sensor, and
wherein computing the first relative angular velocity comprises dividing the size of the pixel by the exposure time.

14. The device of claim 12, wherein the instructions are configured to cause the one or more processors to perform operations comprising further comprising:
determining whether the search schedule is complete;
based on determining that the search schedule is not complete, determining a second pointing direction of the image sensor at completion of scanning the first AVR;
generating, based on the second pointing direction and the orbital data, a second a second set of AVRs that indicate probabilities of the target object having different angular velocities as viewed by the image sensor when the image sensor is pointing in the second pointing direction;

selecting a second AVR from the second set of AVRs for scanning by the image sensor; and adding a second entry to the search schedule that instructs the spacecraft to search for the target object in the second AVR by rotating the image sensor, starting at the second pointing direction, at an angular speed and in a direction corresponding to the central angular velocity of the second AVR.

15. The device of claim 14, wherein a number of AVRs in the second set is different from a number of AVRs in the first set.

16. The device of claim 12, wherein the instructions are configured to cause the one or more processors to perform operations comprising further comprising:

determining whether the search schedule is complete; and based on determining that the search schedule is complete, transmitting the search schedule to the spacecraft.

17. The device of claim 16, wherein the instructions are configured to cause the one or more processors to perform operations comprising further comprising:

receiving, at the spacecraft and from the device, the search schedule;

reading, by the spacecraft, the first entry in the search schedule;

based on reading the first entry, slewing, by the spacecraft, the image sensor starting from the first pointing direction for scanning the first AVR; and controlling, by the spacecraft, the image sensor for recording sensor readings as the image sensor scans the first AVR.

18. The device of claim 17, wherein the instructions are configured to cause the one or more processors to perform operations comprising further comprising:

determining, by the spacecraft, whether there are additional entries in the search schedule;

based on determining that there are additional entries in the search schedule, reading, by the spacecraft, a second entry in the search schedule that includes instructions to search for the target object in a second AVR by rotating the image sensor, starting at a second pointing direction, at an angular speed and in a direction corresponding to the central angular velocity of the second AVR;

responsive to reading the second entry, slewing, by the spacecraft, the image sensor starting from the second pointing direction for scanning the second AVR; and controlling, by the spacecraft, the image sensor for recording sensor readings as the image sensor scans the second AVR.

19. The device of claim 12, wherein the target object includes orbital debris.

20. The device of claim 12, wherein the exposure time includes a time used by the image sensor for recording sensor readings, the exposure time based on one or more of a noise floor, a threshold signal-to-noise ratio (threshold SNR) associated with the image sensor, a size of the target object, or a distance of the target object from the spacecraft.

21. The device of claim 12, wherein the size of an AVR is proportional to a magnitude of the angular velocity at the center of the AVR, the size of an AVR being smaller for a smaller angular velocity at the center of the AVR in comparison to a larger angular velocity at the center of the AVR.

22. The device of claim 12, wherein selecting the first AVR from the first set of AVRs comprises selecting the first AVR based on one of a random selection strategy or a probability of detection of the target object that is associated with each AVR in the first set of AVRs.

* * * * *

UNITED STATES PATENT AND TRADEMARK OFFICE
CERTIFICATE OF CORRECTION

PATENT NO. : 9,916,507 B1  
APPLICATION NO. : 14/940264  
DATED : March 13, 2018  
INVENTOR(S) : Jeffrey Freedman and Erik Halvorson Page 1 of 1

It is certified that error appears in the above-identified patent and that said Letters Patent is hereby corrected as shown below:

In Claim 3, Column 23, Line 20, after "a second" delete "a second".

In Claim 14, Column 24, Line 59, after "operations" delete "comprising".

In Claim 14, Column 24, Line 66, after "a second" delete "a second".

Signed and Sealed this  
First Day of May, 2018

Andrei Iancu  
*Director of the United States Patent and Trademark Office*